June 1, 1971  T. J. STOLKI  3,582,446
COLD-FORMABLE SHEET-LIKE COMPOSITE
Filed May 23, 1969
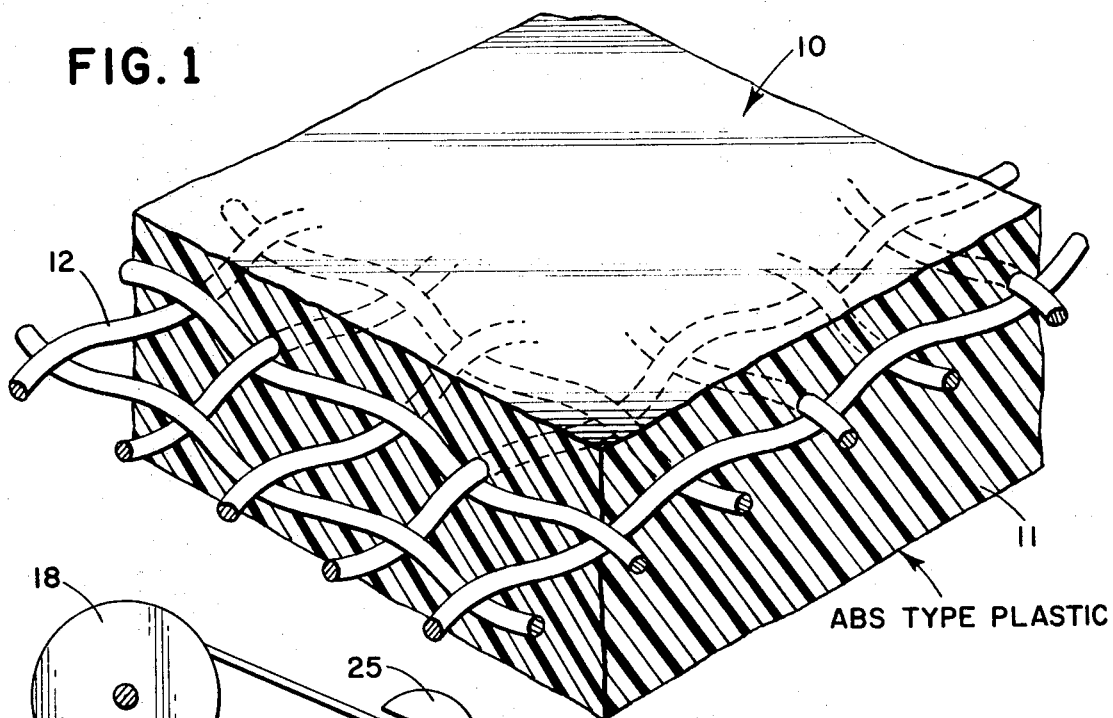
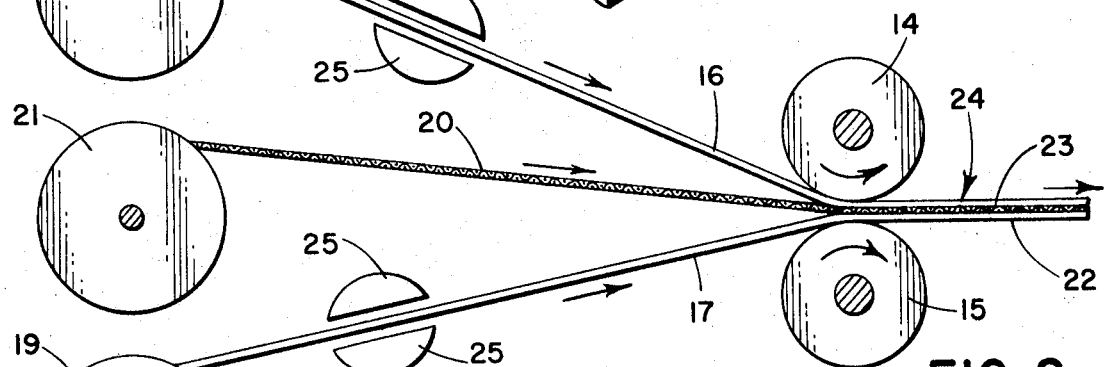
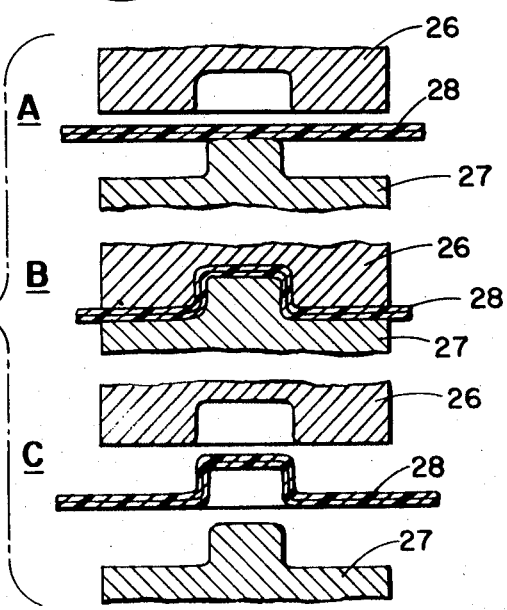
INVENTOR
THOMAS J. STOLKI
BY
JOHN W. KLOOSTER,
ARTHUR E. HOFFMAN,
RUSSELL H. SCHLATTMAN
ATTORNEYS

United States Patent Office 3,582,446
Patented June 1, 1971

3,582,446
COLD-FORMABLE SHEET-LIKE COMPOSITE
Thomas J. Stolki, Wilbraham, Mass., assignor to
Monsanto Company, St. Louis, Mo.
Filed May 23, 1969, Ser. No. 827,233
Int. Cl. B32b 27/12; C08f 15/00
U.S. Cl. 161—89
8 Claims

ABSTRACT OF THE DISCLOSURE

Composites which utilize a matrix layer of a rubber modified interpolymer system of monovinyl aromatic compound in which is embedded an interlayer of metallic filamentous material having a generally regular and recurring pattern. The composites display improved heat resistance and can be cold formed into articles of manufacture by sheet-metal working procedures.

BACKGROUND

In the art of plastics, there has been a long felt need for sheet-like composites which are both cold-formable and heat resistant in the manner of conventionally formed or worked sheet metal. As used throughout this document, the term "cold-formable," "cold-formed," and/or "cold-forming," have reference to the fact that a composite can be conformed to a predetermined shape upon the application to at least one face thereof of sufficient pressure to bend the starting composite formed into the desired predetermined shape under substantially room temperature conditions without substantially altering the structure of the composite or deteriorating its inherent physical and chemical properties. Similarly, as used throughout this document, the terms "heat resistant" and/or "heat resistance" have reference to the fact that a composite has the capacity to resist deformation at elevated temperatures (e.g. at temperatures of about 200° F. or even higher). Heretofore, prior art plastic composites generally have not been cold-formable and/or heat resistant for a number of reasons.

For one reason, prior art composites especially those containing glass fibers have tended to crack or become embrittled upon being cold-formed and thereby tend to loose their structural integrity and/or physical strength characteristics.

For another reason, prior art composites were often so expensive and costly as to be completely non-competitive for applications involving the use of sheet metal. Frequently, in the art of plastics and plastic composites, it has been easier from a processing standpoint and from a starting material standpoint to employ heated molding procedures and gluing procedures to fabricate articles of manufacture rather than to employ cold-forming techniques.

There has now been discovered, however, a sheet-like system utilizing a certain class of known plastic materials in a sheet-like form. The sheet-like form has embedded therein an interlayer of metal having a specific form. The product composite has generally unexpected and superior cold-formability and heat resistance properties compared to either respective type of starting material by itself. There have also been discovered methods for making such a class of composites making possible the production of such composites on an economical basis using conventional plastics sheet-forming technology. The result is a product which can be fairly regarded as being competitve with sheet metal from a fabrication and even from a use standpoint.

The compjosities of this invention have surprisingly improved tensile and flexural characteristics especially at elevated temperatures compared, for example, to a sheet of plastic using only a rubber modified interpolymer system of monovinyl aromatic compound. Furthermore, the resulting laminates have a surprising capacity to be cold-formed using conventional metal working procedures.

SUMMARY

This invention is directed to sheet-like composites which are adapted to be cold-formed and which are heat resistant. These composites utilize at least one matrix layer and at least one interlayer which is positioned within each matrix layer.

Each matrix layer is composed of semi-rigid, solid plastic and has spaced, generally parallel surfaces. Each such layer has an average transverse thickness ranging from about .015 to 0.5 inch, a tensile modulus of elasticity of from about 150,000 to 600,000 lbs./in.$^2$ at 73° F., and a tensile elongation to fail of at least about 5 percent at 73° F., and an impact strength of from about 15 to 100 ft.-lbs. falling dart (measured at 0.1 inch thickness and 73° F.), all such values, of course, being characteristic of the whole layer itself independently. Each matrix layer is in a sheet-like form and comprises a rubber modified interpolymer system of monovinyl aromatic compound as described hereinafter.

Each interlayer is of metal and likewise has spaced generally parallel surfaces. The interlayer has a transverse average thickness ranging from about 1 to 85 percent (10 to 50 percent, preferred) of the total transverse average thickness of the matrix layer and a tensile modulus of elasticity which is at least about equal to that of the matrix layer (for example, at 73° C.), a tensile elongation to fail of at least about 3 percent at 73° C., and preferably a flexibility which is at least about that of the matrix layer at 73° C., all such values, of course, being characteristic of the whole layer itself independently but measured on metal portions thereof.

Each interlayer is in a sheet-like form comprising generally continuous, generally elongated metal portions with open spaces defined therebetween in a generally regular and recurring pattern. The open spaces are systematically positioned across the interlayer relative to a face thereof. The interrelationship between the metal portions and the open spaces is such that from about 5 to 70 weight percent of the interlayer comprises substantially solid (non-porous) metal portions. An interlayer is positioned substantially completely within a matrix layer and is generally co-extensive therewith (except possibly at extreme edge regions).

This invention is also directed to methods for making such composites, and to the cold-formed articles of manufacture made from such composites.

For purposes of this invention, the term "sheet-like" has reference to sheets, films, tubes, extrusion profiles, discs, cones and the like, all generally having wall thicknesses corresponding to the thickness of the matrix layer. Those skilled in the art will appreciate that under certain circumstances, three dimensional sheet-like composites of the invention may, without departing from the spirit and scope of this invention, in effect be filled with some material. In general, a sheet-like composite of this invention is self-supporting, that is, it exists in air at room conditions without the need for a separate solid supporting member in face-to-face engagement therewith in order to maintain the structural integrity thereof without composite deterioration (as through splitting, cracking, or the like).

For purposes of this invention, tensile modulus of elasticity, tensile elongation to fail, flexibility, and the like, are each conveniently measured (using ASTM Test Procedures or equivalent).

A suitable falling dart impact strength measurement test procedure is as follows: A falling dart drop testing apparatus like that described in ASTM D-1709-59T is used. The dart has a 1.5 inch diameter hemispherical head fitted with a 0.5 inch diameter steel shaft 8 inches long to accommodate removable weights. A pneumatic dart release mechanism is positioned so that the dart is dropped 26 inches onto the surface of the test specimen. The test specimen is clamped and held firmly between steel annular rings with an inside diameter of 5 inches. The clamping mechanism is aligned so that the dart strikes the center of the test specimen. The test specimens are preferably 6 inch by 6 inch flat plastic sheets. Specimen thicknesses should not deviate more than 5 percent from the nominal or average thickness. In a test, the specimen is placed in the clamping mechanism, and the dart is loaded with the weight at which 50 percent failure is expected. Then, the test specimen is impacted with the dart and examined for cracks (failure is designated by any crack in the specimen). A new specimen is used for each impact. In the event that the specimen fails (or does not fail), one decreases (or increases) the weight in increments of 0.25 pound until the procedure produces a failure-non-failure (or non-failure-failure) sequence. The results are recorded and the test is preferably continued until at least 15 specimens have been thus tested.

The calculation procedure is as follows:

(A) Record the number of impacts tested after the failure-non-failure (or non-failure-failure) point is reached (N), (B) Add together the dart weights for the N impacts (W), (C) Divide W by N ($W_{50}$), (D) Multiply $W_{50}$ by the drop height (26″) to obtain the 50 percent fail falling dart impact ($F_{50}$).

To determine falling dart impact for composites of this invention, the following modified procedure may be used. The same dart drop testing apparatus as above is used, except that the dart has a one-inch diameter hemispherical head and the test specimen is not clamped, but is placed on a flat, hard annular surface. Test specimens are preferably 4 inch by 4 inch flat composites. The procedure and calculations are described as above.

STARTING MATERIALS—MATRIX LAYER

In general, any semi-rigid solid plastic having the characteristics above described can be used as a matrix layer in a composite of this invention, as indicated above. As used herein, the terminology "rubber modified interpolymer system of monovinyl aromatic compound" has reference to:

(A) A graft copolymer produced by polymerizing monovinyl aromatic compound and at least one other monomer polymerizable therewith in the presence of a preformed elastomer, and mixtures of such;

(B) Mechanical blends of a copolymer of a monovinyl aromatic compound and at least one other monomer polymerizable therewith with a preformed elastomer, and mixtures of such; and (C) Mixtures of A and B.

As used herein, the term "monovinyl aromatic compound" has reference to styrene (preferred); alkyl-substituted styrenes, such as ortho-, meta-, and para-methyl styrenes, 2,4-dimethylstyrene, para-ethylstyrene, p-t-butyl styrene, alpha-methyl styrene, alpha-methyl-p-methylstyrene, or the like; halogen substituted styrenes, such as ortho- meta-, and para-chlorostyrenes, or bromostyrenes, 2,4-dichlorostyrene, or the like; mixed halo-alkyl-substituted styrenes, such as 2-methyl-4-chlorostyrene, and the like; vinyl naphthalenes; vinyl anthracenes; mixtures thereof; and the like. The alkyl substituents generally have less than five carbon atoms per molecule, and may include isopropyl and isobutyl groups.

In general, such an interpolymer system typically has a number average molecular weight ($\overline{M}_n$) ranging from about 20,000 through 120,000, and the ratio of weight average molecular weight ($\overline{M}_w$) to number average molecular weight $\overline{M}_w/M_n$ ranging from about 2 through 10.

In general, suitable elastomers for use in this invention can be saturated or unsaturated, and have a glass phase or second order transition temperature below about 0° C. (preferably below about −25° C.), as determined, for example, by ASTM Test D-746-52T, and have a Youngs Modulus of less than about 40,000 p.s.i. Examples of suitable elastomers include unsaturated elastomers such as homopolymers or copolymers of conjugated alkadienes (such as butadiene or isoprene), where, in such copolymers, at least 50 percent thereof is the conjugated alkadiene; ethylene/propylene copolymers, neoprene, butyl elastomers, and the like; and saturated elastomers such as polyurethane, silicone rubbers, acrylic rubbers, halogenated polyolefins, and the like.

A preferred class of elastomers for use in this invention are diene polymer elastomers. Examples of diene polymer elastomers include, for example, natural rubber having isoprene linkages, polyisoprene, polybutadiene (preferably one produced using a lithium alkyl or Ziegler catalyst), styrene-butadiene copolymer elastomers, butadiene acrylonitrile copolymer elastomer, mixtures thereof, and the like. Such elastomers include homopolymers and interpolymers of conjugated 1,3-dienes with up to an equal amount by weight of one or more copolymerizable monoethylenically unsaturated monomers, such as monovinyl aromatic compounds; acrylonitrile, methacrylonitrile; alkyl acrylates (e.g. methyl acrylate, butyl acrylate, 2-ethylhexyl acrylate, etc.); the corresponding alkyl methacrylates, acrylamides (e.g. acrylamide, methacrylamide, N-butyl acrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halides (e.g. the vinyl and vinylidene chlorides and bromides, etc.); and the like.

A more preferred group of diene polymer elastomers are those consisting essentially of 75.0 to 100.0 percent by weight of butadiene and/or isoprene and up to 25.0 percent by weight of a monomer selected from the group consisting of monovinyl aromatic compounds and unsaturated nitriles (e.g. acrylonitrile), or mixtures thereof. Particularly advantageous elastomer substrates are butadiene homopolymer or an interpolymer of 90.0 to 95.0 percent by weight butadiene and 5.0 to 10.0 percent by weight of acrylonitrile or styrene.

Another preferred class of rubbers for use in this invention are acrylic rubbers. Such a rubber may be formed from a polymerizable monomer mixture containing at least 40 weight percent of at least one acrylic monomer of the formula:

(1) 

where $R_3$ is a radical of the formula:

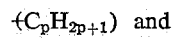

$p$ is a positive whole number of from 4 through 12.

Although the rubber may generally contain up to about 2.0 percent by weight of a crosslinking agent, based on the weight of the rubber-forming monomer or monomers, crosslinking may present problems in dissolving the rubber in monomers for a graft polymerization reaction (as when one makes an interpolymer system as described in more detail hereinafter). In addition, excessive crosslinking can result in loss of the rubbery characteristics. The crosslinking agent can be any of the agents conventionally employed for crosslinking rubbers, e.g. divinylbenzene, diallyl maleate, diallyl fumarate, diallyl adipate, allyl acrylate, allyl methacrylate, diacryates and dimethacryates of poyhydric alcohols, e.g. ethylene glycol dimethacrylate, etc.

One preferred class of monomers for copolymerizing with monovinyl aromatic compounds as indicated above are alphaelectronegatively substituted ethenes. Suitable such monomers are represented by the generic formula:

(2)

where X is selected from the group consisting of —CN,

—COOR$_2$, and —CONHR$_2$

R$_1$ is selected from the group consisting of hydrogen,

—(C$_n$H$_{2n+1}$), —(C$_n$H$_{2n}$)—CN, and —(C$_n$H$_{2n}$)—COOR$_2$

R$_2$ is selected from the group consisting of hydrogen, and

—(C$_m$H$_{2m+1}$)

$n$ is an integer of from 1 through 4, and
$m$ is an integer of from 1 through 8.

Suitable ethene nitrile compounds of Formula 2 are especially preferred and include acrylonitrile (preferred), methacylonitrile, ethacrylonitrile, 2,4-dicyanobutene-1, mixtures thereof, and the like.

Suitable acrylic compounds of Formula 2 are especially preferred and include unsaturated acids such as acrylic acid and methacrylic acid; 2,4-dicarboxylic acid butene-1, unsaturated esters, such as alkyl acrylates (e.g. methyl acrylate, ethyl acrylate, butyl acrylate, octyl acrylate, etc.), and alkyl methacrylates (e.g. methyl methacrylate, ethyl methacrylate, butyl methacrylate, octyl methacrylate, etc.); unsaturated amides, such as acrylamide, methacrylamide, N-butyl acrylamide, etc.; and the like.

Another preferred class of monomers for copolymerizing with monovinyl aromatic compounds as indicated above are conjugated alkadiene monomers. Suitable such monomers include butadiene, 3-methyl-1,3-butadiene, 2-methyl-1,3-butadiene, piperylene chloroprene, mixtures thereof and the like. Conjugated 1,3-alkadienes are especially preferred.

Another preferred class of monomers for copolymerizing with monovinyl aromatic compounds as indicated above are unsaturated esters of dicarboxylic acids, such as dialkyl maleates, or fumarates, and the like.

Considered as a whole, "other monomer polymerizable" with a monovinyl aromatic compound is commonly and preferably an ethylenically-unsaturated monomer.

Optionally, a polymerization of monovinyl aromatic compound with at least one other monomer polymerizable therewith may be conducted in the presence of up to about 2 weight percent (based on total product polymer weight) of a crosslinking agent such as a divinyl aromatic compound, such as divinyl benzene, or the like. Also optionally, such an interpolymer system may have chemically incorporated therein (as through polymerization) a small quantity, say, less than about 2 weight percent (based on total polymer weight) of a chain transfer agent, such as an unsaturated terpene (like terpinolene), an aliphatic mercaptan, a halogenated hydrocarbon, an alpha-methylstyrene dimer, or the like.

In any given rubber-modified interpolymer system of monovinyl aromatic compound used in this invention, there is typically present from about 50 to 93 weight percent of chemically combined monovinyl aromatic compound, from about 5 to 48 weight percent of chemically combined other monomer polymerizable therewith, and from about 2 to 45 weight percent elastomer, based on total interpolymer system weight. Preferably, in such a system, there are from 58 to 74 weight percent monovinyl aromatic compound; 14 to 31 weight percent other monomer polymerizable therewith, and from about 5 to 30 weight percent elastomer (same basis). Of course any given matrix of such a system is chosen so as to have physical characteristics as above indicated. In the case of graft copolymers, and in the case of copolymers of monovinyl aromatic compound and at least one other monomer polymerizable therewith, preferably, the amount of chemically combined monovinyl aromatic compound ranges from about 50 to 85 weight percent and the amount of other monomer polymerizable therewith ranges from about 25 to 15 percent.

Preferred rubber modified interpolymer systems of monovinyl aromatic compounds are graft copolymers of Type (A) above. More preferred such graft copolymers are those of monovinyl aromatic compound, alpha-electronegatively substituted ethene grafted onto preformed elastomer substrate such as polybutadiene; in such a polymer system, the amount of monovinyl aromatic compound typically ranges from about 20 to 95 weight percent (preferably from about 50 to 75 weight percent) while, correspondingly, the amount of chemically combined alpha-electronegatively substituted ethene ranges from about 80 to 5 percent (preferably from about 10 to 25 weight percent). In addition, the amount of chemically combined conjugated alkadiene monomer typically ranges up to about 25 weight weight percent and preferably from about 5 to 20 weight percent. Such a graft copolymer blend usually has a specific viscosity of from about 0.04 to 0.15, preferably about 0.07 to 0.1, measured as a solution of 0.1 percent of the polymer in dimethylformamide at 25° C.

Styrene and acrylonitrile are presently particularly preferred superstrate monomers. Although the amount of copolymer superstrate grafted onto the rubber substrate may vary from as little as 10 parts by weight per 100 parts of substrate to as much as 250 parts per 100 parts, and even higher, the preferred graft copolymers have a superstrate-substrate ratio of about 30–200:100 and most desirably about 30–100:100. With graft ratios above 30:100, a highly desirable degree of improvement in various properties generally is obtained.

The interpolymer systems used in this invention may be produced by various known polymerization techniques, such as mass, emulsion, suspension and combinations thereof. Whatever polymerization process is employed, the temperature, pressure and catalyst (if used) should be adjusted to control polymerization so as to obtain the desired product interpolymer. If so desired, one or more of the monomers may be added in increments during polymerization for the purposes of controlling viscosity and/or molecular weight and/or composition. Moreover, it may be desirable to incorporate low boiling organic, inert liquid diluents during a mass polymerization reaction to lower the viscosity, particularly when a rubber is employed. Moreover, the catalyst may be added in increments, or different catalyst may be added at the same time or at different points during the reaction. For example, when a combined mass-suspension process is employed, generally oil-soluble catalysts may be employed; and both low and high temperature catalysts may be advantageously used in some reactions.

Mechanical blends may be prepared by simple, conventional physical intermixing of preformed polymers. Conveniently, one uses starting materials in a solid, particulate form, and employs such conventional equipment as a ribbon blender, a Henschel mixer, a Waring blender or the like.

Graft copolymers may be prepared, for example, by polymerizing monomers of the interpolymer in the presence of the preformed rubber substrate, generally in accordance with conventional graft polymerization techniques, involving suspension, emulsion or mass polymerization, or combinations thereof. In such graft polymerization reactions, the preformed rubber substrate generally is dissolved in the monomers and this admixture is polymerized to combine chemically or graft at least a portion of the interpolymer upon the rubber substrate. Depending upon the ratio of monomers to rubber substrate and polymerization conditions, it is possible to produce both the desired degree of grafting of the interpolymer onto the rubber substrate and the polymerization of ungrafted interpolymer to provide a portion of the matrix at the same time. A preferred method of preparation involves carrying out a partial polymerization in a bulk system with the rubber dissolved in a mixture of the ethene monomers and vinyl aromatic monomers, followed by completion of the polymerization in an aqueous suspension system.

Blends may be prepared by blending latices of a graft copolymer and an interpolymer and recovering the polymers from the mixed latices by any suitable means, e.g. drum-drying, spray-drying, coagulating, etc. Preferably, they are prepared by simply blending a mixture of the interpolymer and the hydroxylated graft copolymer at an elevated temperature for a period of time sufficient to provide an intimate fusion blend of the polymers. Blends of graft copolymer and copolymer can be prepared by simply blending the two polymers together on conventional plastics working equipment, such as rubber mills, screw-extruders, etc.

As suggested above, the rubber modified interpolymer systems used in this invention contain monovinyl aromatic compound, other monomer polymerizable therewith, and elastomers. In a given such system, at least about 2 weight percent of the elastomer present is graft polymerized as a substrate to (as indicated) a superstrate of copolymer of monovinyl aromatic compound and other monomer polymerizable therewith. Typically, a small amount of the superstrate interpolymer is not in chemical combination with the elastomer substrate because of the less-than-100 percent grafting efficiency of conventional graft copolymerization reactions.

The above-described interpolymer systems are generally well known to the prior art and do not constitute part of the present invention. However, they are to be distinguished from prior art polymer systems such as those of styrene and rubber only with no appreciable amounts of a copolymerized monomer present (sometimes known as high impact polystyrene, as opposed to what is known, for example, as the ABS resins used in this invention). Thus, high impact polystyrene characteristically has a lower softening temperature, and a lower tensile strength at yield than does ABS. In addition, high impact polystyrene is soluble in aliphatic hydrocarbons (such as hexane) whereas ABS only swells in such solvents. It is the superior combination of properties associated with, for example, ABS materials which is believed to contribute to making them valuable in making the unexpectedly cold formable and heat resistant composites of the present invention.

It will be appreciated that any given matrix layer used in this invention generally comprises at least about 75 weight percent of at least one such rubber modified interpolymer system of monovinyl aromatic compound with the balance up to 100 weight percent thereof being conventional plastic processing adjuvants, organic or inorganic fillers, flame retardants, antioxidants, stabilizers, plasticizers, and the like. Besides such 75 weight percent of the interpolymer system, and assuming, of course, compatibility with no adverse effect upon the desired end composite properties of improved cold-formability and heat resistance, a given matrix layer may also contain a minor percentage, say up to about 15 or 20 weight percent or perhaps somewhat more of another polymer, such as a polyvinyl chloride, a polycarbonate, a polysulfonate, a polyphenyleneoxide, a polyamide, or the like, depending upon individual wishes or circumstances, without departing from the spirit and scope of this invention. Fibrous fillers may be used.

Depending on the method of fabricating a sheet-like composite of the present invention, a matrix layer comprising such interpolymer system can be either preformed, or formed in situ around a preformed interlayer. When a matrix layer is preformed, it is conventionally made by the usual extrusion techniques conventionally employed in the plastics industry to make sheets of semi-rigid solid plastic material.

STARTING MATERIALS—INTERLAYER

In general, any metal structure having the characteristics above-described can be used as an interlayer in a composite of this invention, as indicated above. Such structures are known to the prior art.

As used herein, the phrase "generally continuous, generally elongated metal portions" has reference to the fact that in an interlayer the component metal portions thereof are generally continuous and unbroken in at least one direction, taken generally in relation to one face of a matrix layer in a given composite, and also such component metal portions are generally co-extensive with such matrix in such direction. Preferably, such component metal portions are generally continuous and unbroken in at least two such directions (more preferably, one such direction being at 90° with respect to the first), and also such portions are generally co-extensive with such matrix in such directions. An interlayer by itself is self-supporting (that is, it is not composed of loose, non-interconnected metal portions).

Similarly, as used herein, the phrase "generally regular and recurring pattern" has reference to the fact that in an interlayer there is a predictable relationship between one relatively sub-portion thereof and another, as viewed from a face thereof in a macroscopic sense. Such a regular and recurring pattern, and such continuous, elongated metal portions, in an interlayer are deemed necessary and desirable to obtain the improved cold-formability and heat resistance associated with composite products of this invention.

So long as a given interlayer has properties as described above, it can be of any desired construction. However, presently preferred interlayers can be classified as being of two distinct types: Woven wire mesh, and perforated sheet metal (including perforated and expanded metal). Examples of suitable metals include ferrous metals (iron, steel, and alloys thereof), cuprous metals (copper, brass, and alloys thereof), aluminum and aluminum alloys, titanium, tantalum noble metals, and the like. Assuming, of course, compatibility, and no adverse effect upon the desired end composite properties of improved cold-formability and heat resistance, a given interlayer may also have as an integral part thereof non-metallic portions, say up to about 20 weight percent thereof, or somewhat more, but preferably not more than about 10 weight percent thereof, and more preferably not more than about 3 weight percent thereof. Such non-metallic portions may serve, for example, as electrical insulation, to insulate individual strands one from the other as when an electric current is to be passed through a product composite, or, for another example, as an organic or inorganic coating, over the interlayer to enhance bonding and adherence between interlayer and matrix layer. Such non-metallic portions are within the contemplation of this invention and are generally obvious to those skilled in the art as it exists today at the time of the present invention. An interlayer may be pleated, knitted, etc.

Individual metal filaments in an interlayer can generally be of any given cross-sectional configuration and the spacing between adjacent filaments need have no critical values except as otherwise above indicated; such filaments in a given interlayer are preferably uniform.

It will be appreciated that while an interlayer need not be bonded to the matrix, such is a preferred condition, in general. Observe that an interlayer is fully enclosed by the matrix layer which always extends between the open spaces in an interlayer in a continuous manner.

In general, it is preferred for purposes of the present invention to preform an interlayer before combining it with matrix layers. The flexibility of an interlayer (that is the ability of an interlayer to be moved transversely in response to a gross force, as compared to a pointed or highly localized force, applied against one face of the interlayer with the end edges of an interlayer sample being positioned in a generally planar configuration) is greater than the flexibility of the matrix layer similarly measured but without an interlayer being positioned in such matrix layer.

It will be appreciated that the physical properties associated with interlayers used in this invention as detailed above are determined using the filamentous portions of an interlayer and not the interlayer itself since such is generally apparently a more accurate method of determining interlayer properties for purposes of the present invention.

METHODS OF FABRICATION AND USE

As indicated above, any convenient technique for making the composites of this invention can be employed. One method which may be used involves the step of first forming a deck of alternating sheets of preformed matrix material and of preformed interlayer such that the opposed faces of the resulting deck each comprise a different one of such matrix sheets. Thereafter, one applies to the opposed faces of the resulting deck elevated temperatures and pressures for a time sufficient to cause matrix layers to flow through open spaces in the interlayer(s), thereby to consolidate the individual members and form the desired composites. This method can be continuously practiced.

In making a composite of this invention by lamination involving forming or laying up a deck of alternating sheets (as indicated above), it will generally be convenient to employ temperatures in the range of from about 100° C. to 250° C., pressures in the range of from about 10 p.s.i. to 1000 p.s.i. and times in the range of from about 0.1 second to 30 minutes. Pressures, temperatures and times which are greater or smaller than these specific values can, of course, be employed without departing from the spirit and scope of the invention depending on the needs of an individual use situation. In general, the lamination conditions are such that the matrix sheets are caused to flow through open spaces in interlayers to form a desired monolithic structure in the composite with no open spaces between the former individual matrix sheet members.

Those skilled in the art will appreciate that when composites of this invention are made using preformed matrix layers and interlayers, that continuous or batch processing techniques can be employed. Batch processing techniques are particularly valuable when hand operations are involved while continuous operations are particularly useful when large quantities of composites of this invention are being fabricated. It is convenient to use when forming, for example, a three-layered composite, to use two preformed rolls of matrix layer and one preformed layer of interlayer so positioned that the interlayer comes between the two matrix layers. As these layers continuously advance, they are laminated together between rollers which apply the necessary temperatures and pressures for appropriate times to produce composites of the invention.

It will be appreciated that such temperatures and pressures must be applied for times at least sufficient to cause the initially separate but adjacent matrix layers to pass into open spaces in the interlayer and fuse together at points of contact.

Non-planar composites can be made by conventional techniques as those skilled in the art will appreciate. For example, tubes can be made from flat sheet-like composites by thermoforming the sheets on a form and welding the seams together as by molding. The tubes can also be produced by continuous extrusion using a tube die and feeding in a preformed cylindrical interlayer to the die. Two dies can be used for continuous lamination or a single die can be used to effectively encapsulate a preformed interlayer. Temperatures generally above the melting point of the particular interpolymer system used are preferably employed (e.g. 125–270° C.). Sometimes roll pressures sufficient to cause fusion through overlapping faces of matrix material are valuable in forming three-dimensional shapes. Typical roll pressures range from about 40 to 400 pounds per lineal inch.

To cold-form a sheet-like composite of the present invention, one simply applies in a generally continuous manner sufficient pressure to at least one surface thereof so as to conform the starting composite to a predetermined shape, room temperatures can be employed.

Articles of manufacture made from the composites of this invention generally comprise shaped bodies formed from a sheet-like composite of the invention by applying to such composite (as indicated above) sufficient pressure in a generally continuous manner to convert the starting composite into the desired shaped body.

In general, conventional cold-forming procedures known to the art can be employed including preforming (both by shallow draw stamping and deep draw forming), hydro-forming, drop forging, explosion forming, brake bending, compression molding, and the like.

DESCRIPTION OF THE DRAWINGS

The invention is illustrated by reference to the attached drawings wherein:

FIG. 1 is a greatly enlarged side elevational view of a composite of this invention, some parts thereof broken away, and some parts thereof shown in section;

FIG. 2 is a schematic diagrammatic view of a continuous process for making a composite such as shown in FIG. 1;

FIG. 3, parts A, B, and C illustrate a cold-forming operation being performed on a sample composite of this invention.

Referring to FIG. 1, there is seen a composite of this invention designated in its entirety by the numeral 10. Composite 10 is seen to comprise a matrix layer 11 and an interlayer 12. The interlayer 12 is a woven wire mesh; the matrix is a rubber modified interpolymer system of monovinyl aromatic compound. The matrix layer extends through open spaces between the wires.

Referring to FIG. 2, there is seen illustrated a continuous process for making a composite of FIG. 1. Into the nip region, existing between a pair of heated pressure rollers 14 and 15, is continuously fed a preformed sheet 15 from a supply roll 18 and a preformed sheet 17 from a supply roll 19, both sheets 16 and 17 being composed of an interpolymer system of monovinyl aromatic compound and alpha-electronegatively substituted ethene compound. Each sheet 16 and 17 is preferably pre-heated by infra-red heaters 25, or the like. Between sheets 16 and 17 is fed a wire mesh 20 from a supply roll 21. As the assembly of sheet 16, mesh 20, and sheet 17 pass through the nip region between rollers 14 and 15, the assembly becomes fused together so that sheets 16 and 17 are consolidated into a continuous matrix layer 22 which extends through open spaces in the former mesh 20 which now serves as interlayer 23 in a product composite 24 of this invention. The completed composite 24 can be stored in a sheet-like form before use.

Referring to FIG. 3, Part A, there is seen a female die member 26 and a male die member 27 with a composite 28 of the invention positioned therebetween. When force is applied to the male 27 and female 26 die members so that the two are brought together in mating engagement, the composite 28 positioned therebetween is cold-formed into the contours of the die, the resulting appearance of the assembly being as illustrated in Part B of FIG. 3. When thereafter the male 27 and female 26 portions of the die assembly are removed from the now cold-formed composite 28, the composite 28 retains its cold formed shape and structural integrity and appears as generally illustrated in Part C of FIG. 3.

EMBODIMENTS

The following examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

Examples A through I

Twelve inch square sheets composed of graft copolymers of styrene and acrylonitrile on polybutadiene are prepared by extrusion and cutting. These plastic sheet materials used are available commercially. The physical characteristics of each such sheet material as well as its composition are given below in Table I.

of monofilaments of regularly spaced lengthwise extending warp elements, and of monofilaments of regularly spaced, cross-wise extending woof elements. The physical characteristics of each such woven wire sheet type are given below in Table II-A.

Also, twelve inch square sheets of perforated metal are prepared by perforating and cutting, and of perforated and expanded metal are prepared by perforating, expanding

TABLE I.—MATRIX SHEETS

| Example designation | Sheet thickness (mils)[1] | Tensile modulus elasticity, lbs./in.$^2$ at 73° F. | Tensile strength, lbs./in.$^2$ at 73° F. | Tensile elongation, percent at 73° F. | Impact strength, ft.-lbs. falling dart[3] | Composition (Nos. refer to footnotes) |
|---|---|---|---|---|---|---|
| A | 30 | 300,000 | 5,100 | 40 | 110 | (2) |
| B | 30 | 340,000 | 6,000 | 35 | 35 | (4) |
| C | 60 | 400,000 | 6,600 | 25 | 25 | (5) |
| D | 125 | 300,000 | 5,100 | 40 | 110 | (2) |
| E | 250 | 300,000 | 5,100 | 40 | 110 | (2) |
| F | 00 | 300,000 | 5,100 | 40 | 110 | (2) |
| G | 60 | 320,000 | 5,500 | 35 | 70 | (6) |
| H | 60 | 330,000 | 6,300 | 20 | 25 | (7) |
| I | 60 | 370,000 | 7,000 | 28 | 20 | (8) |

[1] Mil equals 0.001 inch.
[2] A graft copolymer of 82 weight percent styrene/acrylonitrile copolymer superstrate on 18 weight percent butadiene elastomer substrate made according to teachings of U.S. Pat. 3,328,488.
[3] Corrected to .100″ sheet thickness basis.
[4] A graft copolymer of 88.5 weight percent styrene/acrylonitrile copolymer superstrate on 11.5 weight percent butadiene elastomer substrate made according to teachings of U.S. Pat. 3,328,488.
[5] A graft copolymer of 92.5 weight percent styrene/acrylonitrile copolymer superstrate on 7.5 weight percent butadiene elastomer substrate made according to teachings of U.S. Pat. 3,328,488.
[6] A graft copolymer of 85 weight percent styrene/acrylonitrile copolymer superstrate on 15 weight percent butadiene elastomer substrate made according to teachings of U.S. Pat. 3,328,488.
[7] A graft copolymer found by analysis to contain about 80 to 85 weight percent styrene/acrylonitrile copolymer superstrate on about 15 to 20 weight percent polyalkyl acrylate ester elastomer substrate available commercially under the trade designation "Luran-S" from Badische Anilin and Soda Fabrik, West Germany.
[8] A graft copolymer found by analysis to contain styrene/acrylonitrile/methylmethacrylate terpolymer on a polybutadiene elastomer substrate available commercially under the trade designation "XT" from the American Cyanamid Company and preparable by the teachings of U.S. Pat. 3,354,238.

Examples J through M

Twelve inch square sheets of woven wire are prepared by weaving and cutting. Each such wire sheet is composed of and cutting. The physical characteristics of each such woven wire sheet type are given below in Tables II-B and II-C.

TABLE II-A.—WOVEN WIRE MESH INTERLAYERS

| Example designation | Mesh thickness (mils) | Tensile modulus of elasticity (lbs./in.$^2$ at 73° F.) | Tensile strength (lbs./in.$^2$ at 73° F.) | Tensile elongation percent at 73° F. | Type metal used in mesh | Wire gauge (inches) | Mesh size (No. of wires per inch) |
|---|---|---|---|---|---|---|---|
| J | .18 | 25×10$^6$ | 100×10$^3$ | 70 | Stainless steel. | .009 | 18 |
| K | .14 | 30×10$^6$ | 70×10$^3$ | 25 | Mild carbon steel. | .007 | 40 |

TABLE II-B.—PERFORATED SHEET METAL INTERLAYERS

| Example designation | Sheet thickness (mils) | Tensile modulus of elasticity (lbs./in.$^2$ at 73° F.) | Tensile strength (lbs./in.$^2$ at 73° F.) | Tensile elongation percent at 73° F. | Type metal in sheet | Number holes in sheet per sq. in. | Average individual hole size (inches) |
|---|---|---|---|---|---|---|---|
| L | 16 | 16×10$^6$ | 70×10$^3$ | 20 | Brass | 169 | 0.050 |

TABLE II-C.—EXPANDED SHEET METAL INTERLAYERS

| Example designation | Initial sheet thickness (before expansion) in mils | Tensile modulus of elasticity (lbs./in.$^2$ at 73° F.) | Tensile strength (lbs./in.$^2$ at 73° F.) | Tensile elongation percent at 73° F. | Type metal in sheet | Approximate rib height (inches) | Approximate expanded hole size (inches) |
|---|---|---|---|---|---|---|---|
| M | .10 | 10×10$^6$ | 40×10$^3$ | 15 | Aluminum | .020 | 0.10 / 0.15 |

Examples 1 through 15

A series of composites of this invention are each prepared as follows from the materials of respective Tables I and II above by the following procedure: Two sheets of a plastic sheet material from Table I are placed together in face-to-face engagement with a single sheet of inter-layer from Table II positioned inbetween. The resulting three-layered construction is placed in a press and subjected to a temperature of about 350–400° F. using a pressure of about 500 lbs./in.$^2$ for a time of about 20 minutes and thereafter is removed and allowed to cool to room temperature. Each product composite has the respective plastic sheet members bonded continuously together through the open spaces in the interlayer. Constructional details are reported below in Table III.

In Examples 1 through 3, the relative flexibility of the matrix layer compared to the interlayer is shown by the following test procedure which is carried out in each instance at approximately 73° F.: A frame 12 inches square equipped with a flange ½" wide is used as a base on which is positioned, successively, 12 inch square sheets of material from Tables I and II, respectively. When sheet material from Table I is being placed on this frame, two such sheet members are always employed, one stacked congruently one over the other, in a resulting composite of this example, two such sheet members previously fused together to form a single matrix layer. Upon each pair of sheet members employed as a matrix layer, a five pound weight is positioned in approximately the center of the top sheet. In each instance, a very slight deflection downwards is observed. When each sheet of material from Table II is placed on this frame individually (as employed as interlayers) and similarly loaded with a five pound weight, the resulting weight causes such sheet material to deflect so much that it and the weight falls through the frame showing that each such sheet material lacks the strength and has too much flexibility to support the five pound weight. Accordingly, it is concluded that the flexibility of each interlayer is very much greater than that of the matrix layer.

The heat resistance of each product composite of Examples 1 through 3 is demonstrated by the fact that a cantilever beam thereof (a sample about 1" by 6" which is clamped on an end thereof) resists deflection downwards when exposed for a measured interval at a temperature of about 130° C. Such is in sharp contrast to the behavior of an equivalent matrix layer (two sheets of material from Table I laminated together by the fusion procedure used to make a composite of this invention but without the interlayer positioned therebetween) when subjected to a similar heat treatment because such control sample deflects and points downward when subjected to such heat for such times. Results are reported in Table III below.

The cold formability of each of the composites of Examples 1 through 3 is demonstrated by the fact that when a sample of each such product composite in the form of a 1½" disc blank is inserted between the mating members of a hemispherical die assembled approximately 1 inch in diameter (½ inch radius) and sufficient pressure is applied to the die members to cold form the product composite between the mating die members so as to produce a finished part approximately ½ inch in depth and 1 inch in diameter in such composite sheet, the resulting composite sheet sample retains its structural integrity upon being removed from such die members. Results of some such testing for capacity to be cold formed are reported in Table III below.

In the remaining examples beyond Example 3, each composite is prepared using the procedure described for Examples 1 through 3. When the materials used in each such product composite are evaluated for relative flexibility of matrix layer compared to interlayer using an analogous test procedure to that described above, it is concluded that the flexibility of each interlayer is very much greater than that of the matrix layer. Similarly, when the heat resistance of each product composite and the cold-formability of each product composite is demonstrated by analogous tests to those described respectively above, it is concluded that each product composite's heat resistance and cold-formability are superior to those of an equivalent matrix layer alone.

TABLE III.—COMPOSITES

| | Matrix layer | | Interlayer | | Composite | | | | |
|---|---|---|---|---|---|---|---|---|---|
| Example Number | Type (Table I) | Total transverse average thickness (mils) | Type (Table II) | Percent transverse average thickness of whole composite | Thermal stability— percent deflection at 130° C. heating time (min.) | | | | Cold-formable (yes or no) |
| | | | | | 0 | 40 | 400 | 1,440 | |
| (Control) | A | 60 | (None) | 0 | 0.0 | 76.9 | 92.4 | 92.4 | Poor. |
| 1 | A | 60 | M | 17 | 0.0 | 14.5 | 18.1 | 20.8 | Yes. |
| 2 | A | 60 | J | 30 | 0.0 | 5.3 | 5.7 | 5.8 | Yes. |
| 3 | A | 60 | L | 27 | 0.0 | 1.5 | 1.5 | 1.5 | Yes. |
| 4 | A | 60 | J | 30 | 25% after 400 minutes | | | | Yes. |
| 5 | B | 125 | J | 14.5 | | | | | |
| 6 | C | 255 | J | 7 | <40% after 400 minutes | | | | Yes. |
| 7 | D | 505 | J | 3.6 | | | | | |
| 8 | E | 38 | L | 4 | <10% after 400 minutes | | | | Yes. |
| 9 | F | 125 | J | 14.5 | | | | | |
| 10 | G | 125 | J | 14.5 | <25% after 400 minutes | | | | Yes. |
| 11 | H | 125 | J | 14.5 | | | | | |
| 12 | I | 125 | K | 11 | | | | | |

Examples 13 through 15

The following examples illustrate fabrication of composites of this invention by a continuous extrusion process.

Continuous lengths of woven metal meshes are prepared, as summarized in Table IV below. Each such mesh is continuously extrusion laminated between a pair of (correspondingly) continuous lengths of plastic material each of whose composition and physical properties are identical to those of Type A in Table I above except that thickness here is 35 mils and length and width dimensions are altered as just indicated.

The lamination procedure for making continuously a composite involves inserting each mesh between a pair of sheets of such plastic material at the nip region existing between the separate sheets as they are being brought together into face-to-face engagement over a polished steel roll about 12 inches in diameter. Velocity of the laminate over the roller is about 4 feet per minute. The matrix enters the roll nip at a temperature of about 300° F.; each sheet of the two which comprise the matrix layer is heated to a temperature of about 300° F. by a bank of infrared heaters before such sheets are brought together to form the matrix at the roll nip.

A sample of each product composite is formed on a metal drawing press using a 6" diameter tool. The cold forming results obtained are recorded in Table V below and show cold formability even though die clearances, lubricants, and male punch radii were not optimum. Gardner Impact, and tensile strength tests are also performed on each sample. Details are reported below in Table V.

TABLE IV.—WOVEN WIRE MESH INTERLAYERS

| Example designation | Mesh thickness (mils) | Tensile modulus of elasticity (lbs./in.² at 73° F.) | Tensile strength (lbs./in.² at 73° F.) | Tensile elongation (percent at 73° F.) | Type metal used in mesh | Wire gauge (inches) | Mesh size |
|---|---|---|---|---|---|---|---|
| N | 22 | 30×10⁶ | 81,500 | 3 | Galvanized steel. | .011 | 13 |
| O | 20 | 10×10⁶ | 35,800 | 10 | Aluminum. | .010 | 16 |
| P | 18 | 25×10⁶ | 98,200 | 40 | Stainless steel. | .009 | 18 |

TABLE V.—COMPOSITES

| Example Number | Type (Table I ¹) | Total transverse average thickness (inches) | Type (Table IV) | Percent transverse average thickness of whole composite (estimate) | Tensile modulus of elasticity, lbs./in.²×10⁵ | Cold-formability |
|---|---|---|---|---|---|---|
| (Control) | A | .070 | (None) | 0 | 3.08 | Poor. |
| 13 | A | .070 | N | 30 | 6.91 | Yes. |
| 14 | A | .070 | O | 28 | 4.55 | Yes. |
| 15 | A | .070 | P | 25 | 4.63 | Yes. |

¹ Sample physical dimensions altered as above described for continuous production of composite.

Examples 16 and 17

Two samples of the composite of Example 3 are placed together in face-to-face engagement and placed in a heated press and subjected to a temperature of about 350° F., and a pressure of about 500 lbs./in.² for a time of about 10 minutes and thereafter removed and cooled to room temperature. The product is a composite having a matrix layer in which are imbedded two interlayers.

When evaluated for thermal stability and cold formability by using the procedures described above in reference to Examples 1–15, superior thermal stability and cold formability (compared to a matrix layer by itself) are observed.

When the foregoing procedure is repeated with two samples of the composite of Example 6, similar results are obtained.

Example 18

A sheet of plastic sheet material designated A in Table I, an interlayer designated J in Table II–B, and a second sheet of plastic material designated C in Table I are laid up in face-to-face engagement with one another with interlayer J in between sheets A and C. The resulting three-layered construction is placed in a press and subjected to a temperature of about 350° F. and a pressure of about 500 lbs./in.² for a time of about 20 minutes, and thereafter removed and allowed to cool to room temperature. The product is a composite having a matrix layer in which is embedded a single interlayer, but in which the matrix layer is composed of two different interpolymer systems of monovinyl aromatic compound and alpha-electronegatively substituted ethylene compound.

When evaluated for thermal stability and cold formability by using the procedures described above in reference to Examples 1–15, superior thermal stability and cold formability (compared to such a matrix layer by itself) are observed.

Such mixtures of interpolymer systems to form a matrix layer are fully within the spirit and scope of this invention.

Example 19

The composites of Examples 1, 2, and 3 after being cold-formed as described above are further processed as follows:

Each finished part is cut out from the remainder of the composite blank thereby to form a hemispherical bearing surface suitable for use in a ball and socket type pivotal joint; for example, truck side mirror (in which the apex of the journal is cured to a stationary frame member and in the concave portion of the ball is journaled one of the two ends of the strut supporting a side mirror as for a truck).

It will be appreciated by those skilled in the art that there is no known critical upper limit for the tensile modulus of the metal interlayer; it appears that such upper limit is dictated only by the availability of materials suitable for use in the interlayer, in a broad sense. A presently preferred range for the interlayer modulus is from about 10,000,000 to 50,000,000 pounds per square inch at 73° F.

The composites of this invention are generally characterized by dimensional stability and substantial freedom from stress cracking over wide environmental temperature ranges.

What is claimed is:

1. A sheet-like composite which is adapted to be cold formed and heat resistant comprising:
    (A) a matrix layer of semi-rigid, solid plastic having spaced, generally parallel, opposed faces, said layer comprising a rubber-modified interpolymer system of monovinyl aromatic compound, and said layer being characterized by:
        (1) having a transverse average thickness ranging from about 0.015 to 0.5 inch,
        (2) having a tensile modulus of elasticity of from about 150,000 to 600,000 lbs./in.² at 73° F.,
        (3) having a tensile elongation to fail of at least about 5 percent at 73° F.,
        (4) having an impact strength of from about 15 to 200 ft.-lbs. falling dart (at 0.1 inch thickness and 73° F.), and
    (B) an interlayer of metal having spaced, generally parallel, opposed faces, said interlayer comprising generally continuous generally elongated metal portions with open spaces defined therebetween, said open spaces being systematically positioned across said interlayer relative to a face thereof, and said interlayer being characterized by:
        (1) having a transverse average thickness ranging from about 1 to 85 percent of the total transverse average thickness of said matrix layer,
        (2) having a tensile modulus of elasticity which is at least about equal to that of the matrix layer at 73° F.,
        (3) having a tensile elongation to fail of at least about 3 percent at 73° F., and
        (4) having an interrelationship between said metal portions and said open spaces such that from about 5 to 70 percent of such interlayer comprises metal portions,
    (C) said interlayer being positioned substantially completely within said matrix layer and generally coextensive therewith.

2. The composite of claim 1 wherein said interlayer comprises a woven wire mesh.

3. The composite of claim 2 wherein said interlayer is a steel mesh.

4. The composite of claim 1 wherein said interlayer comprises a perforated metal sheet.

5. The composite of claim 4 wherein said interlayer comprises an expanded metal sheet.

6. The composite of claim 1 wherein said matrix layer comprises an interpolymer system of styrene, acrylonitrile, and butadiene.

7. The composite of claim 1 wherein said matrix layer has at least two of said interlayers therewithin, each of said interlayers being separated one from the other by a generally uniform thickness of matrix composition.

8. The composite of claim 1 wherein the matrix layer contains in the interpolymer system from about 50 to 93 weight percent of chemically combined monovinyl aromatic compound, from about 5 to 48 weight percent of chemically combined other monomer polymerizable therewith, and from about 2 to 45 weight percent elastomer, based on total interpolymer system weight.

References Cited

UNITED STATES PATENTS

| | | | |
|---|---|---|---|
| 2,527,299 | 10/1950 | Phillips | 161—95X |
| 3,328,488 | 6/1967 | Delecretaz et al. | 260—880 |
| 3,354,238 | 11/1967 | Schmitt et al. | 260—876 |
| 3,382,136 | 5/1968 | Bugel et al. | 161—165 |

ROBERT F. BURNETT, Primary Examiner

R. L. MAY, Assistant Examiner

U.S. Cl. X.R.

161—96, 115, 216, 253; 260—876